United States Patent [19]

Wright

[11] 4,456,541
[45] Jun. 26, 1984

[54] ANTIOXIDANT DIAMINE

[75] Inventor: William E. Wright, Farmington, Mich.

[73] Assignee: Ethyl Corporation, Richmond, Va.

[21] Appl. No.: 257,476

[22] Filed: Apr. 24, 1981

[51] Int. Cl.³ .......................... C10L 1/22; C10M 1/32
[52] U.S. Cl. .......................................... 252/50; 44/72; 252/401
[58] Field of Search ....................... 44/72; 252/50, 401

[56] References Cited
U.S. PATENT DOCUMENTS 3,217,040 11/1965 Schmerling .......................... 252/401
3,275,690 9/1966 Stroh et al. .......................... 260/576

FOREIGN PATENT DOCUMENTS 1240654 5/1967 Fed. Rep. of Germany.
1495705 1/1972 Fed. Rep. of Germany.

Primary Examiner—Charles F. Warren
Assistant Examiner—Y. Harris-Smith
Attorney, Agent, or Firm—Donald L. Johnson; John F. Sieberth; John F. Hunt

[57] ABSTRACT

Organic material such as lubricating oil is stabilized against gradual oxidative degradation by the addition of aromatic diamines such as 3,5-diethyltoluene-2,4-diamine, 3,5-diethyltoluene-2,6-diamine, mixtures thereof, and the like.

18 Claims, No Drawings

ANTIOXIDANT DIAMINE

BACKGROUND OF THE INVENTION

I. Field of the Invention

This invention relates to aromatic antioxidants in general and in particular to aromatic diamine antioxidants for organic materials.

II. Description of the Prior Art

Various materials including aromatic amines have been suggested for use as antioxidants in organic materials. Among those compounds are those described in U.S. Pat. No. 3,217,040. Also known are various other types of antioxidants such as those described in U.S. Pat. Nos. 4,066,562, 4,104,255, 4,222,883, and 4,222,884.

Some of the compounds of the present invention are known per se for uses in various other fields. In particular, the 3,5-diethyltoluenediamine compounds and the 4,4'-methylene-bis[2,6-diisopropylaniline] of the present invention are known as valuable chain extenders in the formation of polyurethanes, especially in processes known as reaction injection molding "RIM."

The antioxidants of the prior art, however, suffer various disadvantages. Notably, most of the known antioxidants are solids, amorphous, crystalline, or similar structures which are often difficult to dissolve in various organic materials, especially lubricating oils. Additionally, many of the known antioxidants have a very poor solubility in organic materials and additional solubility agents must sometimes be added, thereby detracting from the value of the antioxidant. Volatility problems also prevent the use of some of these compounds. Other antioxidants such as the ortho and paraphenylene diamines are suitable antioxidants in gasoline, for example, but are suspected toxins.

SUMMARY OF THE INVENTION

According to the present invention, stabilized organic compositions are provided which contain an aromatic diamine having the amino groups unsubstituted except for hydrogen (H). Examples of such compounds are triethyl-m-phenylene diamine; 4,4'-methylenebis[2,6-diisopropylaniline]; and the alkyl-substituted toluene diamines. These include the preferred 3,5-diethyltoluene diamines or mixtures of the two isomers, having the following structures:

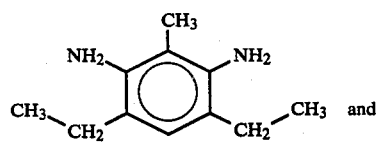

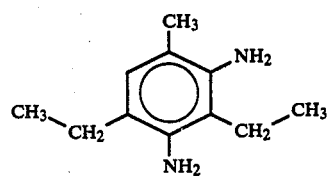

That is, antioxidants provided according to the present invention include 3,5-diethyltoluene-2,4-diamine and 3,5-diethyltoluene-2,6-diamine and mixtures thereof. Various other alkyl-substituted toluene diamines are also suitable for the invention; e.g., 3,5,6-triethyltoluene-2,4-diamine. 1,3-diamine-2,4,6-triethylbenzene is another example. Preparation of such compounds is described and discussed in *Alkylation of Aromatic Amines*, Stroh et al, from *Newer Methods of Preparative Organic Chemistry*, Volume 2, Academic Press, 1963, pages 227–233.

The compounds of the present invention are especially valuable in comparison to presently available antioxidants because they prevent an increase in viscosity of the stabilized organic material for extensive periods under strenuous oxidative conditions, including high temperature.

Additionally, the antioxidant additives of the present invention are advantageous over presently known antioxidants because they are very stable at room temperature. Most are liquid phase chemicals at room temperature and thus are readily added to various organic materials in which they are very soluble. Finally, the antioxidant aromatic amines of the present invention are valuable because they control viscosity increase, maintain low acid number in a substrate, and are relatively non-corrosive to copper and lead (bearings, etc.). The non-corrosivity is an unexpected result because most amines in the prior art are known to corrode copper bearings and the like. The antioxidants of the present invention are compatable with seals and other contact surfaces at high temperature and pressure. The antioxidants also tend to inhibit sludge and varnish formation, contrary to the expected activity of amines, especially the amines having substituted amino groups such as N,N'-diisopropyl-p-phenylene diamine:

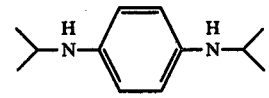

DESCRIPTION OF THE PREFERRED EMBODIMENTS

A preferred embodiment of the present invention is an organic material normally susceptible to degradation in the presence of oxygen and containing an antioxidant amount of one of the aromatic diamines described above, such as those listed below, or mixtures thereof:

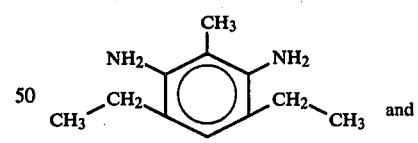

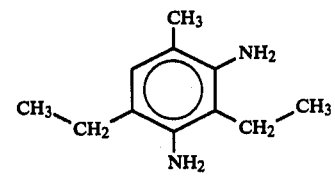

The compounds can be prepared by known methods. Commonly, 2,4- or 2,6-toluenediamine is alkylated with ethylene under pressure of about 200 atmospheres at about 280°–300° C. in the presence of catalysts. U.S. Pat. No. 3,275,690, disclosing such a process, is incorporated herein by reference.

Thus, the antioxidant additives of the present invention are readily available since they may be produced by any of several known methods. Of course, their antioxidant activity was not known prior to this invention.

Other preferred embodiments include the bis-dialkylanilines such as 4,4'-methylenebis[2,6-diisopropylaniline]:

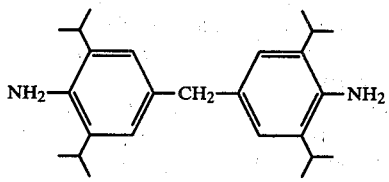

Still another preferred antioxidant compound is the triethyl-m-phenylenediamine. This diamine may be synthesized by the methods discussed in *Alkylation of Aromatic Amines,* Stroh et al, from *Newer Methods of Preparative Organic Chemistry,* Volume 2, Academic Press, 1963, pages 227–233.

Its successful use as an antioxidant was especially unexpected because some structurally similar substituted amine compounds were known to be unusable.

The following example illustrates a known manner of obtaining an antioxidant compound of the invention.

EXAMPLE 1

200 Parts of 2,4-toluenediamine are heated in an autoclave to 280° C. with eight parts of anhydrous aluminum chloride and 150 parts of a Solution of aluminum anilide in aniline (2% Al). Ethylene is introduced up to a pressure of 200 atmospheres until 100 parts ethylene are absorbed. 95% conversion to 3,5-diethyltoluene-2,4-diamine is achieved.

The antioxidants of the invention can be used in a broad range of organic material normally subject to gradual degradation in the presence of oxygen during use over an extended period. In other words, the organic compositions protected by the present antioxidants are the type in which the art recognizes the need for antioxidant protection and to which an antioxidant of some type is customarily added to obtain an extended service life. The oxidative degradation protected against is the slow gradual deterioration of the organic composition rather than, for example, combustion. In other words, the present additives are not flame retarding additives nor flame suppressing additives and the degradation protected against is not combustion but, rather, the gradual deterioration of the organic composition due to the effects of oxygen over an extended period of time.

Examples of organic materials in which the additives are useful include polymers, both homopolymers and copolymers, of olefinically unsaturated monomers, for example, polyolefins such as polyethylene, polypropylene, polybutadiene, and the like. Also, poly-halohydrocarbons such as polyvinyl chloride, polychloroprene, polyvinylidene chloride, polyfluoro olefins, and the like, are afforded stabilization. The additives provide antioxidant protection in natural and synthetic rubbers such as copolymers of olefinically unsaturated monomers including styrene-butadiene rubber (SBR rubber), ethylenepropylene copolymers, ethylene-propylenediene terpolymers such as the terpolymer of ethylene, propylene and cyclopentadiene or 1,4-cyclooctadiene. Polybutadiene rubbers sich as cis-polybutadiene rubber are protected. Poly-2-chloro-1,3-butadiene (neoprene) and poly-2-methyl-1,3-butadiene (isoprene rubber) are stabilized by the present additives. Likewise, acrylonitrile-butadiene-styrene (ABS) resins are effectively stabilized. Ethylenevinyl acetate copolymers are protected, as are butene-methylacrylate copolymers. Nitrogen-containing polymers such as polyurethanes, nitrile rubber, and lauryl acrylate-vinyl-pyrrolidone copolymers are effectively stabilized. Adhesive compositions such as solutions of polychloroprene (neoprene) in toluene are protected.

Petroleum oils such as solvent-refined, midcontinent lubricating oil and Gulfcoast lubricating oils are effectively stabilized. In hydrocarbon lubricating oils, both mineral and synthetic, the present additives are particularly effective when used in combination with a zinc dihydrocarbyldithiophosphate, e.g. zinc dialkyldithiophosphate or zinc dialkaryldithiophosphate.

The antioxidants of the present invention may be used with mineral oils whether obtained by solvent refining, hydrotreating, hydrocracking, or another method. Thus the antioxidants of the present invention are suitable for combination with a mineral oil of lubricating viscosity which is derived from a lubricating oil produced by contacting a hydrocarbon feedstock with hydrogen preferably in the presence of catalyst effective to promote hydrocracking, at hydrocarbon hydrocracking conditions to produce an oil of lubricating viscosity having an increased viscosity index relative to the viscosity index of the hydrocarbon feedstock.

Typical applications of the antioxidant additives of this invention in oils include use in all motor oils, crankcase oil, turbine oil, diesel oil, industrial oil, hydraulic fluids and the like.

The antioxidant additives of the invention are also useful in fuels including, but not limited to gasoline, alcohol, and the like.

Synthetic ester lubricants such as those used in turbines and turbojet engines are given a high degree of stabilization. Typical synthetic ester lubricants include di-2-ethylhexyl sebacate, trimethylolpropane tripelargonate, $C_{5-9}$ aliphatic monocarboxylic esters of pentaerythritol, complex esters formed by condensing under esterifying conditions, mixtures of polyols, polycarboxylic acids, and aliphatic monocarboxylic acids and/or monohydric alkanols. An example of these complex esters is the condensation product formed from adipic acid, ethyleneglycol and a mixture of $C_{5-9}$ aliphatic monocarboxylic acids. Plasticizers such as dioctyl phthalate are effectively protected. Heavy petroleum fractions such as tar and asphalt can also be protected should be need arise.

Polyamides such as adipic acid-1,6-diaminohexane condensates and poly-6-aminohexanoic acid (nylon) are effectively stabilized. Polyalkylene oxides such as copolymers of phenol with ethylene oxide or propylene oxide are stabilized. Polyphenyl ethers such as poly-2,6-dimethylphenyl ether formed by polymerization of 2,6-dimethylphenol using a copper-pyridine catalyst are stabilized. Polycarbonate plastics and other polyformaldehydes are also protected.

Linear polyesters such as phthalic anhydride-glycol condensates are given a high degree of protection. Other polyesters such as trimellitic acid-glycerol condensates are also protected. Polyacrylates such as polymethylacrylate and polymethylmethacrylate are effectively stabilized. Polyacrylonitriles and copolymers of acrylonitriles with other olefinically unsaturated monomers such as methylmethacrylates are also effectively stabilized.

The additives can be used to protect any of the many organic substrates to which an antioxidant is normally added. It can be used where economics permit to protect such substrates as asphalt, paper, fluorocarbons such as teflon, polyvinyl acetate, polyvinylidene chloride, coumarone-indene resins, polyvinyl ethers, polyvinylidene bromide, polyvinyl bromide, acrylonitrile, vinyl bromide copolymer, vinyl butyral resins, silicones such as dimethylsilicone lubricants, phosphate lubricants such as tricresylphosphate, and the like.

The additives are incorporated into the organic substrate in a small but effective amount so as to provide the required antioxidant protection. A useful range is from about 0.005 to about 10 weight percent, and a preferred range is from about 0.05 to 5 weight percent.

Methods of incorporating the additive into the substrate are well known. For example, if the substrate is liquid the additive can be merely mixed into the substrate. Frequently the organic substrate is in solution and the additive is added to the solution and the solvent removed. Solid organic substrates can be merely sprayed with the additive or with a solution of the additive in a volatile solvent. For example, stabilized grain products result from spraying the grain with a toluene solution of the additive. In the case of rubbery polymers the additive can be added following the polymerization stage by mixing it with the final emulsion or solution polymerization mixture and then coagulating or removing solvent to recover the stabilized polymer. It can also be added at the compounding stage by merely mixing the additive with the rubbery polymer in commercial mixing equipment such as a Banbury blender. In this manner, rubbery polymers such as styrene-butadiene rubber, cispolybutadiene or isoprene polymers are blended with the antioxidant together with the other ingredients normally added such as carbon clack, oil, sulfur, zinc oxide, stearic acid, vulcanization accelerators, and the like. Following mastication, the resultant mixture is fabricated and molded into a finished form and vulcanized. The following will serve to illustrate the manner in which the additives are blended with various organic substrates.

EXAMPLE 2

To a synthetic rubber master batch comprising 100 parts of SBR rubber having an average molecular weight of 60,000 50 parts of mixed zinc propionate stearate, 50 parts carbon black, 5 parts road tar, 2 parts sulfur and 1.5 parts of mercapto benzothiazole is added 1.5 parts of the product from Example 1. After mastication, the resultant master batch is cured for 60 minutes using 45 psi steam pressure, resulting in a stabilized SBR vulcanizate.

EXAMPLE 3

A cis-polybutadiene polymer is prepared having 90 percent cis configuration by polymerizing butadiene in a toluene solvent employing a diethyl aluminum chloride-cobalt iodide catalyst. Following the polymerization, a small amount sufficient to provide 0.25 weight percent of 3,5-dimethyltoluene-2,6-diamine is added to the toluene solution, following which the solution is injected into boiling water together with steam causing the solvent to distill out and the cis-polybutadiene to coagulate, forming a rubber crumb. The crumb is dried and compressed into bales, resulting in a stabilized cis-polybutadiene.

EXAMPLE 4

To 100,000 parts of a blend of 15 weight percent decene-1 trimers and tetramers (4.1 cs 100° C.) and 85 weight percent 150 SUS neutral mineral oil is added 500 parts of the product from Example 1. Following this is added 100 parts of a zinc dialkyldithiophosphate, 50 parts of an overbased calcium alkaryl sulfonate, 1,000 parts of a polydodecylmethacrylate V.I. improver and 2,000 parts of a 70 percent active oil solution of an alkenyl succinimide of tetraethylenepentamine in which the alkenyl group has a molecular weight of 950. The resultant mixture is blended while warm, following which it is filtered and packaged, giving a stable, partial synthetic lubricating oil useful in automotive engines.

EXAMPLE 5

To 10,000 parts of trimethylolpropane tripelargonate is added 200 parts of tricresylphosphate, 10 parts of dimethyl silicone, 10 parts of benzothiazole, and 50 parts of a 4:1 mixture of the 2,4- and 2,6-diamines of the invention.

EXAMPLE 6

To 1,000 parts of polyethylene is added 3 parts of a 4:1 mixture of 2,4- and 2,6-diamine. The mixture is heated to its melting point and stirred and then passed through an extruder having a central mandrel to form tubular polyethylene which is inflated to form a useful polyethylene film.

Tests were conducted which show the antioxidant effectiveness of the diamines of this invention.

The following comparative examples illustrate the excellent antioxidant characteristics of the present invention.

EXAMPLE 7

To a large test tube containing about 2 kgs of mineral lubricating oil is added a small portion of a 4:1 isometric mixture of the 2,4- and 2,6-diamines of this preferred embodiment of the present invention so as to constitute 0.5 weight percent of the mixture. Additionally, a small portion, about 0.1 weight percent of the mixture, of *Cobra Tec* metal deactivator is added to the mixture. *Cobra Tec* is a trademark of Sherwin Williams. About 50 ppm iron is added in the form of ferric naphthenate to promote oxidation according to standard bench test procedure.

A copper lead bearing is placed in the bottom of the test tube and a fritted sparger is placed adjacent thereto in the test tube. Air was bubbled through the sparger, rising through the mineral lubricating oil in the test tube, for a period of about 18 hours at a rate of 6 liters per hour.

After 18 hours, the change in viscosity of the lubricating oil and the weight loss of the copper lead bearing are determined. Additionally, the appearance of the bearing and accumulation of sludge on the test tube are observed and rated by comparison. As can be seen from the following table, the diamine isomeric mixture of this preferred embodiment gives outstanding results after 18 hours.

TABLE 1

| | Additive Concentration Weight Percent | Percent Viscosity Increase |
|---|---|---|
| (control) | 0.0 | 125 |
| (control) | 0.0 | 130 |
| (control) | 0.0 | 113 |
| (control) | 0.0 | 141 |
| | 0.25 | 13 |
| | 0.5 | 0 |
| | 0.5 | 0 |
| | 0.5 | 5 |
| | 0.75 | −1 |
| | 1.0 | 0 |

These values compare favorably with, and indeed exceed, the antioxidant activity of current commercially available additives.

Since some of the diamines of the present invention are liquid at room temperature, they represent a valuable antioxidant for use with a very broad range of organic material normally susceptible to oxidative degradation. Furthermore, the diamines of the present invention have proven to be very readily soluble in mineral lubricating oils, various polymers, and other organic materials, thus obviating the need for solubility additives.

In the above Example 7, only relatively small weight loss of the copper lead bearing is evidenced and the bearings retain good appearance.

TABLE 1A

| Additive Concentration Weight Percent | Bearing Weight Loss (mg) | Bearing Appearance | |
|---|---|---|---|
| 0.0 | 65 | copper | (corroded) |
| 0.0 | 57 | copper | |
| 0.0 | 80 | copper | |
| 0.0 | 70 | copper | |
| 0.25 | 53 | bronze | (normal) |
| 0.5 | 21 | bronze | |
| 0.5 | 26 | bronze | |
| 0.5 | 25 | bronze | |
| 0.75 | 20 | bronze | |
| 1.0 | 17 | bronze | |

None of the bearings tested in the inventive composition appear blackened or corroded, but rather retain a good bronze surface.

Finally, additional data shows the value of the diamines of the present invention as antioxidants. A visual observation of the sludge on the test tube walls is recorded. Also, the acid number for the diamine mixture of the present invention is modified only slightly after the above-described testing for 18 hours as shown in the following comparative table:

TABLE 2

| Additive Concentration Weight Percent | Visual Sludge Rating | Acid Number Increase (mg KOH/g) |
|---|---|---|
| 0.0 | poor | 5.9 |
| 0.0 | poor | 6.6 |

TABLE 2-continued

| Additive Concentration Weight Percent | Visual Sludge Rating | Acid Number Increase (mg KOH/g) |
|---|---|---|
| 0.0 | poor | |
| 0.0 | poor | |
| 0.25 | poor | |
| 0.5 | good | 0.4 |
| 0.5 | good | 0.5 |
| 0.5 | poor | |
| 0.75 | good | |
| 1.0 | good | |

EXAMPLE 8

Following the same procedure and using the same equipment as in Example 7, another antioxidant of the invention is tested in two separate runs. The test is conducted with 4,4′-methylenebis[2,6-diisopropylaniline]. The additive is combined with oil in the test tube so as to constitute about 0.5 weight percent of the mixture. A metal deactivator is added so as to constitute about 0.1 weight percent of the mixture. After about 18 hours, favorable antioxidant activity is observed. Although some corrosion is apparent on the bearings, the Percent Viscosity Increase is limited to 26% and 6%, respectively, in the two runs. Also, the Acid Number Increase is small at 2.9 mg KOH/g and 0.7 mg KOH/g, respectively.

The above results show the antioxidant effectiveness of the additives of the present invention.

I claim:

1. Organic material normally susceptible to gradual degradation in the presence of oxygen during use over an extended period and of the type in which the art recognizes the need for antioxidant protection and to which an antioxidant of some type is customarily added to obtain an extended service life, containing an antioxidant amount of an aromatic diamine wherein the amino groups are unsubstituted except for hydrogen.

2. The organic material of claim 1 wherein said aromatic diamine is a 3,5-diethyltoluenediamine of structure (I) or (II): or mixtures thereof

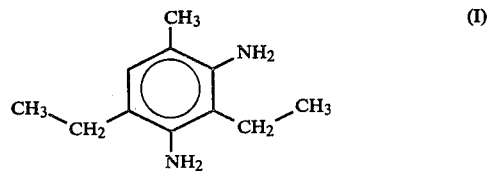

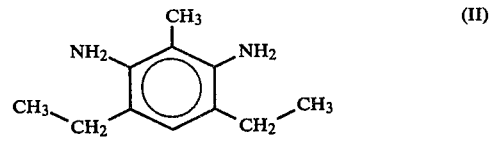

3. A composition of claim 1 wherein said organic material is selected from the group consisting of lubricating oils and liquid hydrocarbon fuels.

4. A composition of claim 3 wherein said organic material is a hydrocarbon lubricating oil.

5. A composition of claim 3 wherein said organic material is gasoline.

6. A composition of claim 3 wherein said organic material is diesel fuel.

7. A composition of claim 2 wherein said diamine is 3,5-diethyltoluene-2,4-diamine.

8. A composition of claim 2 wherein said diamine is 3,5-diethyltoluene-2,6-diamine.

9. A composition of claim 8 further comprising 3,5-diethyltoluene-2,4-diamine.

10. A composition of claim 9 wherein the ratio of said 2,4-diamine to said 2,6-diamine is about 4:1.

11. A composition of claim 10 wherein said organic material is a hydrocarbon lubricating oil.

12. The organic material of claim 1 wherein said aromatic diamine is an ar-,ar-,ar-triethyl-m-phenylenediamine.

13. The organic material of claim 1 wherein said aromatic diamine is 4,4'-methylenebis[2,6-diisopropylaniline].

14. The organic material of claim 1 wherein said aromatic diamine is a triethyltoluenediamine.

15. Organic material normally susceptible to gradual degradation in the presence of oxygen during use over an extended period and of the type in which the art recognizes the need for antioxidant protection and to which an antioxidant of some type is customarily added to obtain an extended service life, containing an antioxidant amount of an active aromatic diamine having alkyl groups of from 1 to 3 carbon atoms in the ortho position to each amino group, said diamine having amine groups unsubstituted except for hydrogen.

16. The material of claim 15 wherein at least two of said alkyl groups contain 2 or 3 carbon atoms.

17. The material of claim 15 wherein at least three of said alkyl groups are linear alkyl groups.

18. The material of claim 15 wherein said diamine has at least one alkyl group ortho to a first amine group and two alkyl groups ortho to a second amine group.

* * * * *